Sept. 9, 1969  S. T. GIORDANO  3,466,554
ACCELERATOR APPARATUS AND METHOD OF SHAPING CAVITY FIELDS
Filed March 10, 1967  5 Sheets-Sheet 1

$L = 6"$  $D = 8"$  $d' = 1.5"$  $\ell = 3.6"$ $L = 6"$  $D = 8"$  $d' = 1.5"$  $\ell = 3.6"$

INVENTOR.
SALVATORE T. GIORDANO
BY
ATTORNEY

3-STEM

4-STEM

6-STEM

INVENTOR.
SALVATORE T. GIORDANO

INVENTOR.
SALVATORE T. GIORDANO

United States Patent Office 3,466,554
Patented Sept. 9, 1969

3,466,554
ACCELERATOR APPARATUS AND METHOD OF SHAPING CAVITY FIELDS
Salvatore T. Giordano, Port Jefferson, N.Y., assignor to the United States of America as represented by the United States Atomic Energy Commission
Filed Mar. 10, 1967, Ser. No. 623,190
Int. Cl. H01j 23/34
U.S. Cl. 328—233                    5 Claims

ABSTRACT OF THE DISCLOSURE

Apparatus and method of shaping cavity fields in linear accelerator structures having drift tubes by generating $TS(N)_{nml}$ mode, transverse, drift tube, supporting stem resonances with an associated band pass whereby the frequency of the transverse stem resonances alters the field and frequency of the drift tube operation about the $TM_{010}$ mode to provide low beam loading and detuning effects.

This invention was made in the course of, or under a contract with the United States Atomic Energy Commission.

CROSS-REFERENCES TO RELATED APPLICATIONS

U.S. application Ser. No. 499,120, filed Oct. 20, 1965, entitled: High Energy Linear Accelerator Apparatus by S. Giordano.

BACKGROUND OF THE INVENTION

In high energy particle physics, it is desirable to accelerate a beam of charged particles to high energies along a linear equilibrium axis for injection into a cyclic accelerator for further acceleration to very high energies of up to about 33 bev. or more. Various proposals have been made and used to accomplish such linear acceleration, such as those arrangements described in U.S. Patent 2,874,326, issued Feb. 17, 1959, by N. C. Christofilos et al. While these arrangements have been useful and can accomplish the desired charged particle acceleration along a linear equilibrium axis, their shunt impedance has gone down sharply at increasing particle energies whereby they have been limited to particle energies of up to only 50 mev. or less. It is also desirable to provide a high density linear accelerator beam and economically, accurately and efficiently to control it.

SUMMARY OF THE INVENTION

It has been discovered in accordance with this invention that the cavity fields can be shaped in an Alvarez type linear accelerator structure having drift tubes by operating the drift tubes at a frequency and field in the $TM_{010}$ mode and generating transverse stem resonances whose frequency alters the field about this $TM_{010}$ mode to provide low beam loading and detuning effects and high shunt impedance even at high particle energies and densities. With the proper selection of components and steps, as described in more detail hereinafter, the desired high energy, high density injection is achieved.

The above and further novel features of this invention will now appear more fully from the following description of an embodiment of this invention and the novel features will be particularly pointed out hereinafter in connection with the appended claims.

BRIEF DESCRIPTION OF THE DRAWINGS

FIGURE 1b is a partial end view of FIG. 1a;
FIGURE 2 is a graphic illustration of frequency vs. phase shift in the single stem drift tube cavity of FIG. 1a;
FIGURE 3 is a graphic illustration of frequency vs. phase shift in the unloaded cavity of FIG. 1a;
FIGURE 4b is a partial end view of FIG. 4a;
FIGURE 5 is a graphic illustration of frequency vs. phase shift in the double stem drift cavity of FIG. 4a;
FIGURE 8b is a partial end view of the electric and magnetic fields and the conduction current of the double stem structure of FIG. 4a;
FIGURE 8c is a partial end view of the electric and magnetic fields and the conduction current of the triple stem structure of FIG. 6a.

DESCRIPTION OF THE PREFERRED EMBODIMENTS

Figure 7:
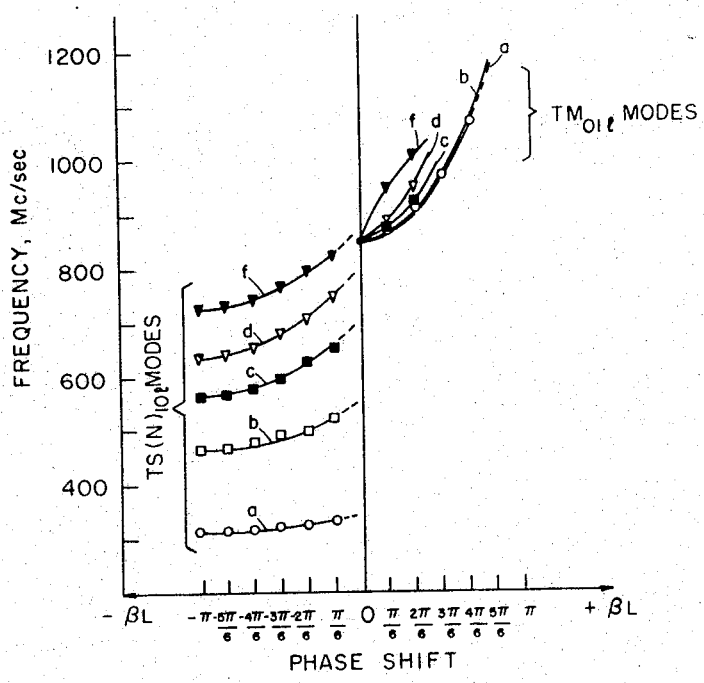
FIGURE 7 is a graphic illustration of the frequency vs. phase shift of the apparatus of FIG. 6a through FIG. 6c.

It is known that beams of high energy charged particles may be accelerated in an Alvarez type linear accelerator structure having drift tubes operating at a frequency and field in any one of a variety of modes of field and frequency. An Alvarez type linear accelerator is shown and discussed in "The Linear Accelerator Injector for the AGS" by S. Giordano, the inventor of this invention, and reprinted in the 1960 International Convention Record, Part 9. FIG. 7 of that paper illustrates a linear accelerator of this type. Acceleration of the particles by this type of accelerator is based on the fact that all the particles making up a particular beam have substantially the same momentum, and the particles and mathematics of such accelerating systems are well known in the art.

The invention hereinafter described utilizes an accelerating system of this type in which the spaces around the drift tubes through which the particles pass are subjected to transverse electric field, drift tube, stem resonances in a manner described below in connection with particular configurations of the described drift tubes.

Figure 1A:
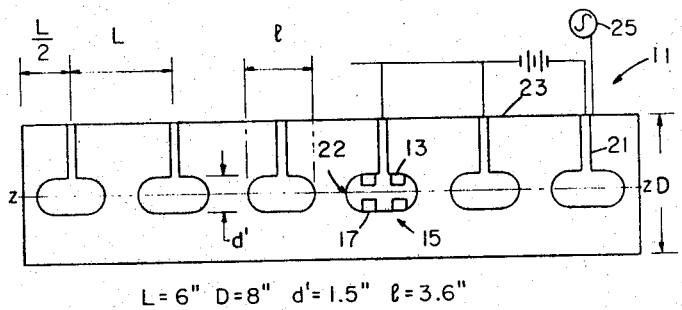
FIGURE 1a is a partial cross-section of a linear accelerator having Alvarez type drift tubes therein.
Figure 1B:
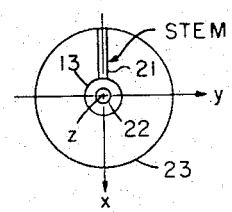

In order to explain how the method and apparatus of this invention accomplish the function of producing transverse electric field, drift tube, stem resonances, reference is made to FIGURE 1a wherein is illustrated a longitudinally extending z—z axis representing the linear equilibrium path of the particles in an Alvarez type linear accelerator 11. Disposed symmetrically around and along the length of the z—z axis are a plurality of Alvarez type drift tubes 13 having quadrupole focusing lens pairs 15 therein forming a cylindrical beam path. In the accelerator 11 shown, L is 6″ and is the distance between the center of the supporting stems 21, which are equidistant from the ends of the drift tubes 13. D is 8″ and is the diameter of the cylindrical accelerating cavity 23. Little d is 1.5″ and is the diameter of the drift tubes 13 and l is 3.6″, which is the length of the drift tubes 13. This structure is scaled down from mc./sec. for operation at $B \approx 0.32$. Each quadrupole 17 of each pair 15, as is understood in the art, tends to focus the particles passing therethrough in some particular transverse plane, such as either the X or Y planes, at right angles to each other and passing through the z—z axis as shown in FIG. 1b. Each drift tube 13 has a hole 22 therethrough that is accurately and symmetrically supported along the z—z axis by means of stems 21 connected between the side of the drift tubes 13 and the inside wall of the cylindrical accelerating cavity 23 as illustrated in FIGURES 1a and 1b.

Figure 2:
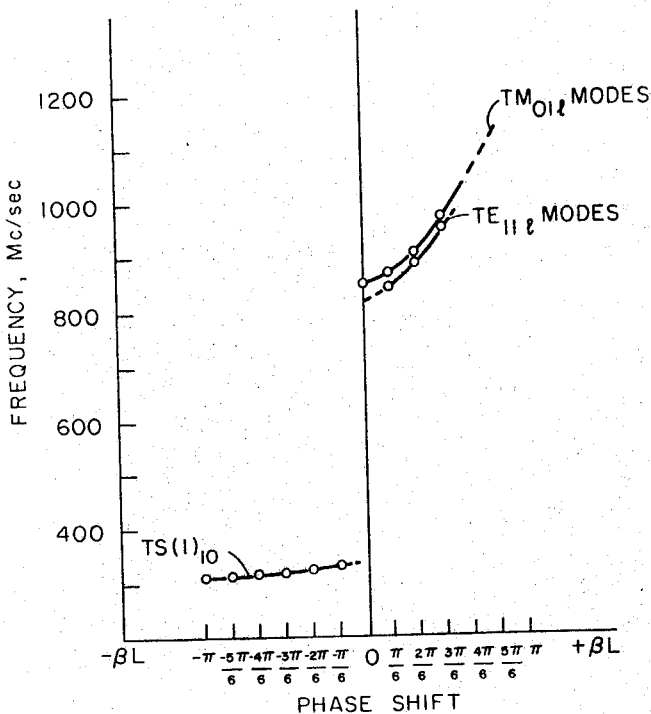

A high megacycle/sec. pulsed radio frequency source 25 such as is described in more detail in FIG. 1 of my above cited 1960 paper, excites the accelerator 11 in a particular standing wave, frequency and field mode to build up electric and magnetic fields to some steady state value with an indefinite phase velocity in the RF structure and wherein the fields have the same relative phase, as is well known in the art. FIGURE 2 herein illustrates the modes of the cavity 23 of this accelerator 11.

It has been discovered, in accordance with this invention that the addition of suitable stems to the drift tubes decreases the frequency spacing between the $TM_{111}$ and $TM_{011}$ modes. Also, the increase in frequency of operation between the $TM_{010}$ and $TM_{011}$ modes is effectively the same as increasing the bandwidth of the structure about the operating $TM_{010}$ mode whereby the effective increase in bandwidth reduces detuning and beam loading effects.

Figure 3:
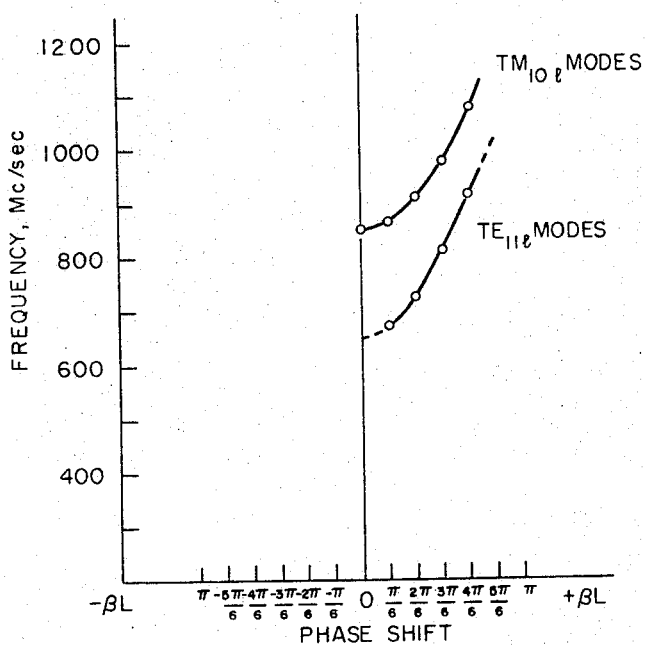

This will be understood, for example, by reference to FIGURE 3, which illustrates the $TM_{011}$ and $TE_{111}$ modes in an unloaded cylindrical cavity 23 having a length of 36 inches and a diameter of 10.8 in. The dimensions of the described unloaded cavity correspond with the dimensions of the above described loaded cavity of FIG. 1a but, as shown in these figures, the frequency spacing of the loaded and unloaded cavities is different. It will also be noted from FIGURE 3 that 650 mc./sec. is the lowest frequency that energy can propagate down the unloaded structure.

Figure 4A:
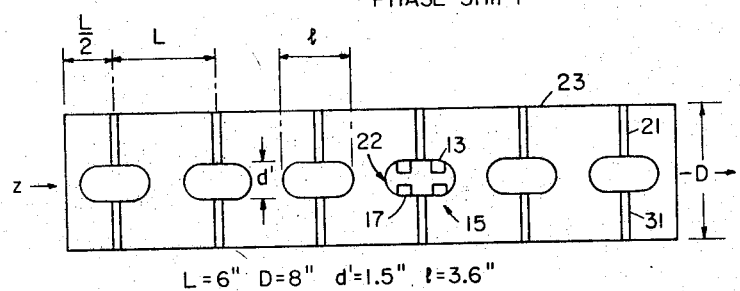
FIGURE 4a is partial cross-section of the linear accelerator cavity of FIG. 1a having two stems 180° apart for the drift tubes thereof.
Figure 4B:
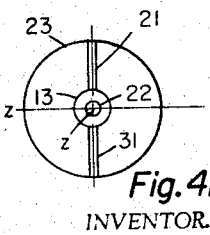
Figure 5:
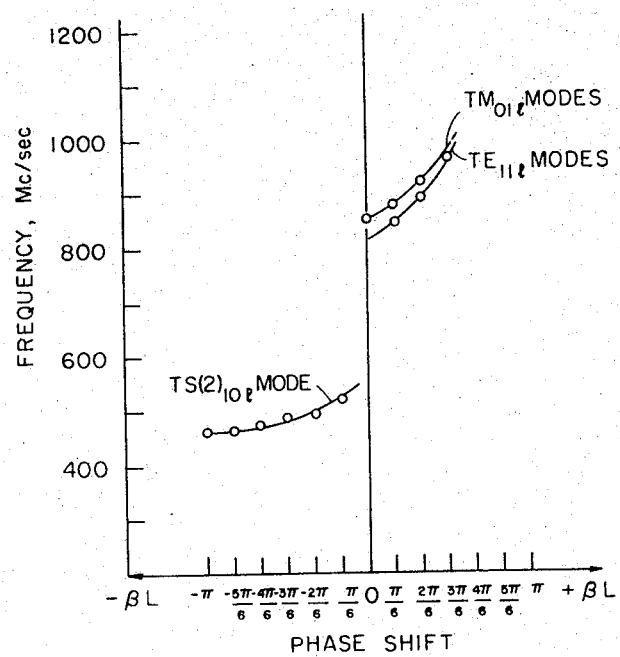

Referring also to FIGURES 4a and 4b, which show partial cross-section and end views of another stem added to the described apparatus of FIG. 1a, the second stem 31 being disposed 180° from the first stem 21. From FIGURE 5, which is a plot of the $TM_{011}$, $TE_{111}$ and $TS(2)_{101}$ modes for this two-stem case, it is seen that there is very little change in either the $TM_{011}$ or the $TE_{111}$ modes, as compared to the single-stem case, but the $TS(2)_{101}$ modes are higher in frequency than the $TS(1)_{011}$ modes.

Figure 6A:
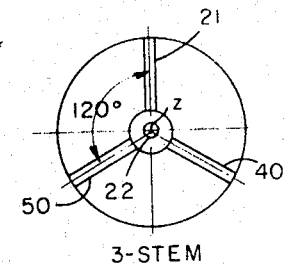
FIGURE 6a is a partial end view of the accelerator cavity of FIG. 1a having three supporting stems 120° apart for the drift tubes thereof.
Figure 6B:
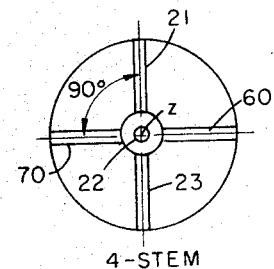
FIGURE 6b is a partial end view of the accelerator cavity of FIG. 1a having four supporting stems 90° apart for the drift tubes thereof.
Figure 6C:
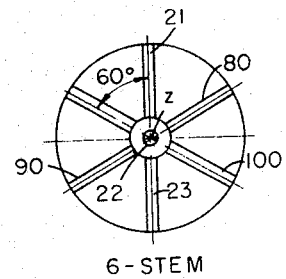
FIGURE 6c is a partial end view of the accelerator cavity of FIG. 1a having six supporting stems 60° apart for the drift tubes thereof.

FIGURES 6a, 6b and 6c illustrate the various three, four and six-stem structures, for which cases the $TE_{111}$ modes are all above 1200 mc. The stems are 21, 40 and 50 at 120° in FIG. 6a, 61 and 70 at 90° in FIG. 6b and 21, 80, 90 and 100 at 60° in FIG. 6c. FIGURE 7 illustrates the corresponding measurements of frequency vs. phase shift for the $TM_{011}$ and $TS(N)_{101}$ modes for the one, two, three, four and six-stem cases. Line a represents the one-stem case, line b represents the two-stem case, line c represents the three-stem case, line d represents the four-stem case and line f represents the six-stem case. In plotting the ΔE vs. the Δf for both the Alvarez and 4-stem structures it has been determined that there is a considerable reduction of ΔE, by at least a factor of ¼ for 4-stem structure as compared to the Alvarez 2-stem structure. In terms of the effective length of the structures, for the Alvarez structure $\Delta E/E_0 \propto (L/\lambda)^2$ and for the 4-stem structure, since ΔE is reduced by ¼, $\Delta E/E_0 \propto (L/2\lambda)^2$, which is equivalent to reducing the electrical length of the structure by a factor of two. As can be seen from FIGURE 7, the $TS(N)_{nml}$ modes are associated with transverse stem resonances and lower in frequency than the normal $TE_{111}$ and $TM_{011}$ modes. Also, the frequency spacing between the $TM_{010}$ mode and the $TM_{011}$ mode for the 4-stem configuration is approximately 2.5 times as great as that for the 2-stem Alvarez case. Moreover, the transverse $TS(N)_{10}$ stem resonance forms a periodic coupled system having $TS(N)_{101}$ resonances. It will be seen, therefore, that a new structure and method are provided with novel $TM_{010}$ mode systems, using multiple stem supports that result in an effective bandwidth greater about the $TM_{010}$ mode than the conventional Alvarez structure.

In one example, a cavity 23 having six drift tubes and three stems per drift tube has the following modes: $TS(3)_{101}$, $TS(3)_{102}$, $TS(3)_{103}$, $TS(3)_{104}$, $TS(3)_{105}$ and $TS(3)_{106}$ corresponding to a phase shift per cell of $-\pi/6$, $-2\pi/6$, $-3\pi/6$, $-4\pi/6$, $-5\pi/6$, and $6\pi/6$ respectively wherein a cell length is defined as the length between the center of two adjacent gaps between drift tubes 13. The $TS(N)_{100}$ mode is degenerate due to the boundary conditions, and cannot be excited. Also, it will be noted from FIGURE 7, the frequency of the $TM_{010}$ mode is essentially unchanged and independent of the number of stems. The modes adjacent to the $TM_{010}$ mode are affected by the stems, and it is these modes that determine the shape of the dispersion curve about the $TM_{010}$ mode.

To reduce the beam loading and tank detuning effects in the "0" or "π" mode structure, $d^2\omega/d\beta^2$ is made as large as possible, the "0" and π modes being located at the end of a band pass. For the π/2 mode, which is located at the center of the band pass, the quantity $d\omega/d\beta$ is made as large as possible.

From FIGURE 7, it is seen that for the one and two stem cases, the $TM_{011}$ band pass remains relatively unaffected by the $TS(N)_{101}$ band pass. In going to three, four or six stems the $TM_{011}$ band pass is influenced by the $TS(N)_{101}$ band pass. Thus at a region between four and six stems it is possible to have the $TS(N)_{011}$ and $TM_{011}$ band passes join together to form a continuous dispersion curve. Here the behavior of the $TM_{010}$ mode is like a π/2 mode.

This is clear since, as seen in FIG. 7, the six stem case leads to an overcompensated case whereas the four stem case leads to undercompensation. The desired compensation, therefore, is between the four and six stem cases, i.e., between 700 and 800 mc. since this provides the desired transverse stem resonance.

Figure 8A:
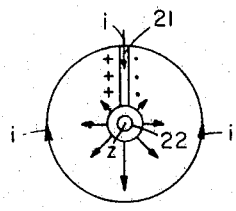
FIGURE 8a is a partial end view of the (E) electric and (H) magnetic fields and the (i) conduction current of the single stem structure of FIG. 1a where $\rightarrow$ equals electric field E, $+\,+\,+\,\ldots$ equals magnetic field H and $i$ equals conduction current.

FIGURE 8a shows the electric and magnetic field configurations for the $TS(1)_{10}$ mode for a drift tube with a single stem in an open-ended, long, hollow cavity such as is shown in FIG. 1a and FIG. 1b. Here → equals the electric field E, + + + ... equals the magnetic field H and i equals the conduction current. The values of N, m and n from this structure correspond to N=1 for a single stem 21, m=0 since there is no radial variation of the field and n=1 since the radial electric field is zero at the stems and maximum midway between the stems. There can be higher order modes corresponding to n>1, where the radial electric field goes to zero between stems, but for the case shown in FIGURE 8b, the electric field has a circumferential variation of $$\left|\sin \frac{n\varphi N}{2}\right| = \left|\sin \frac{\varphi}{2}\right|$$

FIGURE 8a also shows the conduction current flowing on the stem 21, for which case the single stem transverse resonance of 320 mc./sec. is well below the normal $TE_{111}$ and $TM_{011}$ modes of the hollow guide 23 and the fields from the transverse stem resonance decay exponentially along the guide 23.

Figure 8B:
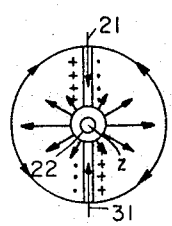

In now considering the corresponding characteristics of a drift tube 13 with stems 21 and 31 that are 180° apart, in an open-ended, long, hollow cavity 23, the field configuration is shown in FIGURE 8b, which corresponds to the $TS(2)_{10}$ mode, where $N=2$ since there are two stems, and $n=1$ since the circumferential field variation goes as $$\left|\sin \frac{nN\varphi}{2}\right| = |\sin \varphi|$$

Figure 8C:
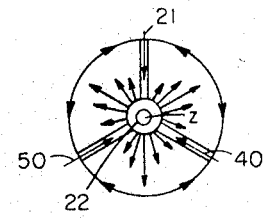

The transverse resonant frequency for this case is 495 mc./sec. wherein the circumferential field variation does not change sign, as would be the case for a normal $TE_{11}$ mode where the stem is perpendicular to the transverse electric field, For the three-stem case shown in FIGURE 8c the $TS(3)_{10}$ mode provided has a resonant frequency of 610 mc./sec.

Figure 9:
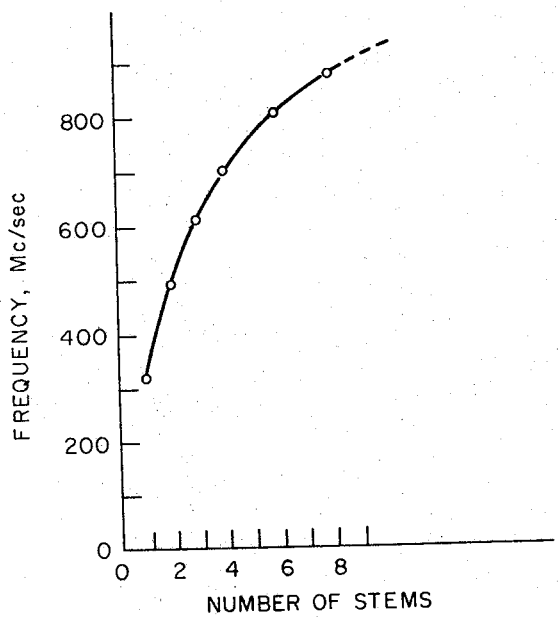
FIGURE 9 is a graphic illustration of the transverse stem and drift tube resonances of a single drift tube in a long, open-ended cavity having from 1–9 supporting stems of ¼" diameter.

As shown in FIGURE 9, a plot of the transverse stem and drift tube resonant frequency vs. number of stems for a single drift tube in an open-ended cavity 23 shows the resonant frequency going up with the number of stems.

Figure 11:
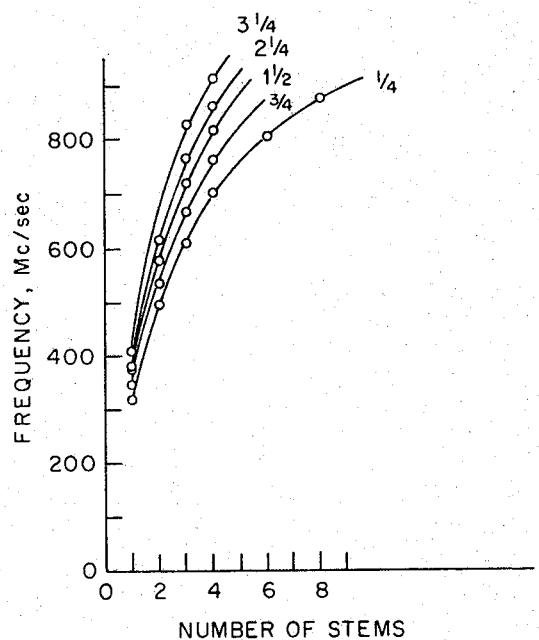
FIGURE 11 is a graphic illustration of the various transverse stem and drift tube resonances for various flared stem dimensions for the apparatus of FIG. 10.
Figure 10:
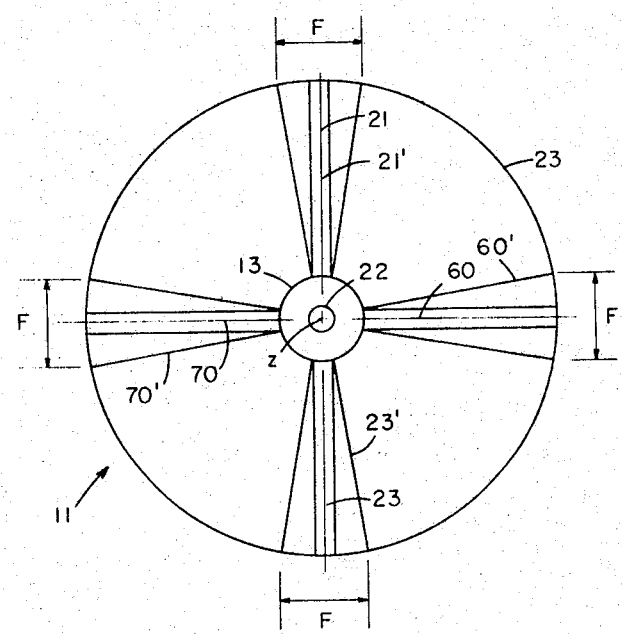
FIGURE 10 is a partial end view of the accelerating cavity of FIG. 6b having four tapered stems for the drift tubes thereof.

As shown in FIGURE 9, the transverse stem resonances for the four and the six stem cases are 700 and 800 mc./sec. respectively. However, the stem resonance is a function of either the number of stems or the width of the stems. For example, the measurements shown in FIG. 9 were made with stems having a uniform diameter of ¼ in. but sheet metal tabs, added to these stems to flare them changes the transverse stem and drift tube resonances. One set of flared tabs is shown in FIG. 10. The tabs 21′, 23′ and 70′ are spaced at 90° and flare from a ¾″ diameter base F at the wall of cavity 23 to ¼ diameters at the outside of the drift tubes 13. The stems 21, 23, 60 and 70 of FIG. 6b are disposed inside the mentioned tabs. The results of stem flaring from ¼ in. to 3¼ in. are shown in FIG. 11, where the transverse stem resonance vs. the number of stems for different flare widths is shown.

Figure 12:
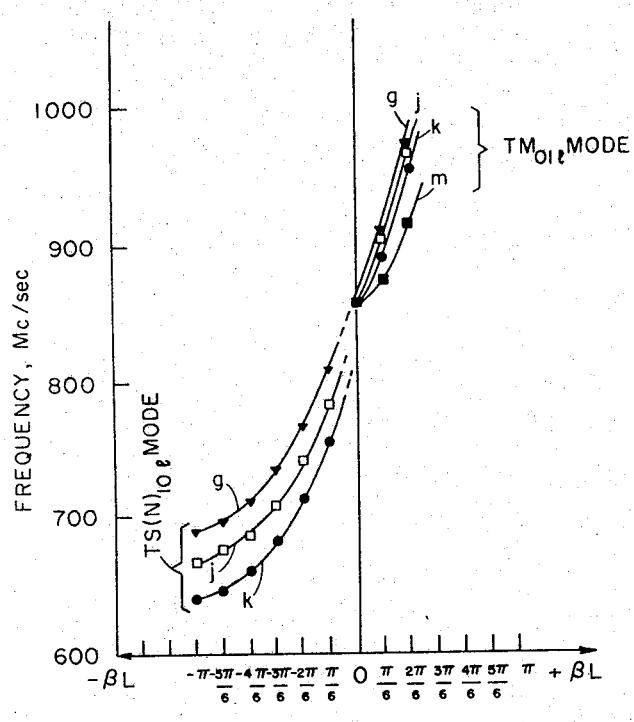
FIGURE 12 is a graphic illustration of frequency vs. phase shift for the accelerating cavity of FIG. 1a with four stems of various flares for the drift tubes thereof.

FIGURE 12 is a plot of the $TM_{011}$ and $TS(N)_{011}$ modes for a four-stem structure with stem flares of ¼ in., ½ in., and ¾ in. Here lines represent the frequency vs. phase shift of the mentioned modes and line $g$ represents the 4-stem ¾″ diameter flare case, $j$ represents the 4-stem ¼″ diameter flare case, $k$ represents the 4-stem ¼″ diameter flare case. Also plotted by line $m$ in FIG. 12 are the $TM_{011}$ modes for a single stem to illustrate the change in the shape of the dispersion curve in going from one stem to four stems and in going from a ¼ inch flare to a ¾ inch flare. It will be seen that a ¾ inch flare at 750 mc./sec. provides a substantially linear dispersion curve with a substantially nonzero slope in the region of the $TM_{010}$ mode. The result with this Alvarez type drift tube structure and the recited conditions provides a practical, simple, efficient, and effective method and apparatus for achieving the desired stem resonances and for providing low amplitude and phase detuning effects and high shunt impedance even with high density beams of charged particles accelerated in this structure up to 200 mev. or more.

In actual practice, the four-stem, ¼ inch flare structure of FIG. 10 reduced the tank detuning effects by a factor of four over the single, double stem or other Alvarez systems known heretofore. Moreover, the flared four-stem structure having a flare of ¾ in. can reduce the tank detuning effects by a factor of up to 10 or more. Additionally, the additional stems and $TS(N)_{10}$ modes do not result in an appreciable reduction in the shunt impedance and provide for the acceleration of high density beams of protons or other charged particles for injection into a cyclic-high energy particle accelerator.

This invention has the advantage of providing a practical, effective and efficient linear accelerator structure and method having a high shunt impedance and low amplitude and phase detuning effects for accelerating charged particles in high density beams up to energies of 200 mev. or more. Moreover, by the introduction of a set of transverse stem resonances, the $TM_{01n}$ dispersion curve can be changed in accordance with this invention to improve the operating characteristics about the $TM_{010}$ accelerating mode. In actual embodiment having four-stemmed drift tubes supports tapered at between ¼ in. and ¾ in., for example, the tank detuning effects were reduced by a factor of from four to ten, while still maintaining high shunt impedance. The described multistem structure of this invention, moreover, employs conventional drift tube linac structure with the advantage of relative immunity from beam loading and detuning effects due to the greater mode-spacing near the $TM_{010}$ mode. Additionally, this invention provides a new set of modes that are associated with the resonance in the circumferential fields of the stem systems, called $TS(N)_{101}$ modes which couple to the usual $TM_{011}$ modes and lead to the shaping of the dispersion curve about the $TM_{010}$ resonance.

What is claimed is:

1. A method of shaping the cavity fields produced around drift tubes in a linear accelerator tank structure by a field producing high frequency electrical energy source, comprising operating said tank structure at a frequency and field in the $TM_{010}$ mode while generating transverse stem resonances whose frequency alters the field about the $TM_{010}$ mode to provide low beam loading and tank detuning effects while maintaining high shunt impedance.

2. The invention of claim 1 in which said stem resonances produce a substantially linear dispersion curve with substantially non-zero slope in the region of said $TM_{010}$ mode.

3. In a linear accelerator for high energy positively charged particles having a cylindrical accelerator cavity wall and a radio-frequency energy source for forming a resonating tank in which tank detuning effects can occur, and wherein said particles cause beam loading effects and the shunt impedance tends to go down sharply as the particle energies and velocities are increased in said accelerator by said radio-frequency energy source, said accelerator also having a plurality of magnetic lens containing drift tubes inside said cavity wall forming a continuous series of adjacent accelerating gaps whose size and spacing increase progressively to correspond with the frequency of said radio frequency energy source and the increasing particle velocities in said gaps caused by said radio-frequency energy source, and supporting stems between said cavity wall and said drift tubes whose spacing corresponds with the spacing of said gaps, the improvement, comprising transverse tuning means formed by equally spaced annular sets of said stems for each of said drift tubes, respectively, for producing stem resonances for decreasing said beam loading and tank detuning effects for providing for the simultaneous acceleration of said particles in a continuous series of said adjacent accelerating gaps from low particle velocities to higher particle velocities with large net particle energy gains, and for providing high shunt impedance, for the production of high energy, high density beams of said particles.

4. The invention of claim 3 in which the number of stems in said transverse tuning means forms sets of between two and eight stems to compensate for variations in beam loading and detuning effects over large variations in said particle velocities.

5. The invention of claim 3 in which said sets of said stems have four stems in each of said sets, and each stem has a taper with a uniformly increasing round cross-section for producing said stem resonances.

References Cited
UNITED STATES PATENTS

| | | | |
|---|---|---|---|
| 3,012,170 | 12/1961 | Heil | 315—5.42 X |
| 3,067,359 | 12/1962 | Pottier | 315—5.42 |
| 3,142,777 | 7/1964 | Sullivan | 315—3.5 |
| 3,181,024 | 4/1965 | Sensiper | 315—3.5 |

H. K. SALBURNE, Primary Examiner

SAXFIELD CHATMON, Jr., Assistant Examiner

U.S. Cl. X.R.

313—63; 315—5.42